(12) United States Patent
Vaarala et al.

(10) Patent No.: US 9,828,212 B2
(45) Date of Patent: Nov. 28, 2017

(54) ARRANGEMENT AND A METHOD FOR MEASURING THE POSITION OF AN INSTALLATION PLATFORM IN AN ELEVATOR SHAFT

(71) Applicants: Tapio Vaarala, Helsinki (FI); Pekka Kilpelainen, Oulu (FI)

(72) Inventors: Tapio Vaarala, Helsinki (FI); Pekka Kilpelainen, Oulu (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/087,185

(22) Filed: Mar. 31, 2016

(65) Prior Publication Data

US 2016/0311648 A1 Oct. 27, 2016

(30) Foreign Application Priority Data

Apr. 23, 2015 (EP) ..................................... 15164767

(51) Int. Cl.
*G01B 11/14* (2006.01)
*B66B 5/00* (2006.01)
(Continued)

(52) U.S. Cl.
CPC ................ *B66B 5/00* (2013.01); *B66B 19/00* (2013.01); *B66B 19/002* (2013.01); *G01S 17/46* (2013.01)

(58) Field of Classification Search
CPC ......... B66B 19/002; B66B 5/00; B66B 19/00; G01S 17/46
(Continued)

(56) References Cited

U.S. PATENT DOCUMENTS

2009/0120734 A1 5/2009 Barneman et al.
2010/0309452 A1* 12/2010 Qiu .......................... B66B 19/00
356/3

(Continued)

FOREIGN PATENT DOCUMENTS

CN 1587905 A 3/2005
JP H09221288 A 8/1997
(Continued)

OTHER PUBLICATIONS

European Search Report for European Application No. EP15164767 dated Oct. 2, 2015.

*Primary Examiner* — Sunghee Y Gray
(74) *Attorney, Agent, or Firm* — Harness, Dickey & Pierce, P.L.C.

(57) ABSTRACT

The arrangement comprises an installation platform movable upwards and downwards in the elevator shaft, at least one light source arranged at a predetermined position in the elevator shaft below the installation platform and producing a vertically upwards directed collimated light beam, at least one primary digital imaging device positioned on the installation platform and being arranged to take electronic images of the light beam hitting the photosensitive sensor of the at least one primary digital imaging device or of a pattern created by the light beam on a reflective or transparent screen positioned at a distance in front of the photosensitive sensor of the at least one primary digital imaging device, whereby the horizontal position of the installation platform in relation to the elevator shaft can be measured from the electronic images taken by the at least one primary digital imaging device.

8 Claims, 9 Drawing Sheets

(51) Int. Cl.
 *B66B 19/00* (2006.01)
 *G01S 17/46* (2006.01)
(58) Field of Classification Search
 USPC .......................................................... 356/622
 See application file for complete search history.

(56) References Cited

U.S. PATENT DOCUMENTS

2010/0320036 A1* 12/2010 Ferreira ................ B66B 1/3492
  187/394
2011/0134439 A1* 6/2011 Juvonen ................ B66B 19/002
  356/625
2015/0217972 A1 8/2015 Hawkins et al.

FOREIGN PATENT DOCUMENTS

| JP | 2007223776 | * | 9/2007 | ............. B66B 7/047 |
| JP | 2007223776 A | | 9/2007 | |
| WO | WO-2007135228 A1 | | 11/2007 | |
| WO | WO-2014053184 A1 | | 4/2014 | |

* cited by examiner

ARRANGEMENT AND A METHOD FOR MEASURING THE POSITION OF AN INSTALLATION PLATFORM IN AN ELEVATOR SHAFT

This application claims priority to European Patent Application No. EP15164767.4, filed on Apr. 23, 2015, the entire contents of which are incorporated herein by reference.

FIELD OF THE INVENTION

The invention relates to an arrangement and a method for measuring the position of an installation platform in an elevator shaft.

BACKGROUND ART

An elevator comprises an elevator car, lifting machinery, ropes, and a counterweight. The elevator car is supported on a transport frame being formed by a sling or a car frame. The sling surrounds the elevator car. The lifting machinery moves the car upwards and downwards in a vertically extending elevator shaft. The sling and thereby also the elevator car are carried by the ropes, which connect the elevator car to the counterweight. The sling is further supported with gliding means at guide rails extending in the vertical direction in the elevator shaft. The gliding means can comprise rolls rolling on the guide rails or gliding shoes gliding on the guide rails when the elevator car is moving upwards and downwards in the elevator shaft. The guide rails are supported with fastening means on the side wall structures of the elevator shaft. The gliding means engaging with the guide rails keep the elevator car in position in the horizontal plane when the elevator car moves upwards and downwards in the elevator shaft. The counterweight is supported in a corresponding way on guide rails supported with fastening means on the wall structure of the elevator shaft. The elevator car transports people and/or goods between the landings in the building. The elevator shaft can be formed so that one or several of the side walls are formed of solid walls and/or so that one or several of the side walls are formed of an open steel structure.

The guide rails are formed of guide rail elements of a certain length. The guide rail elements are connected in the installation phase end-on-end one after the other in the elevator shaft. The guide rails are attached to the walls of the elevator shaft with fastening means at fastening points along the height of the guide rails.

WO publication 2007/135228 discloses a method for installing the guide rails of an elevator. In the first phase a first pair of opposite car guide rail elements is installed starting from the bottom of the shaft. In the second phase a second pair of opposite car guide rails is installed end-on-end with the first pair of opposite car guide rails. The process is continued until all the pairs of opposite car guide rails have been installed. The counterweight guide rails are installed in a corresponding manner. A laser transmitter is used in connection with each guide rail to align the guide rail in the vertical direction. A self-directional laser could be used, which automatically directs the laser beam vertically upwards. The laser transmitters are first positioned at the bottom of the shaft when the lowermost section of guide rails is installed. An alignment appliance provided with an alignment element is supported on each guide rail at each position where the alignment of the guide rail is to be done. The laser beam hits the alignment element, whereby the guide rail can be aligned so that the hitting point of the laser beam is in the middle of the alignment element. The laser transmitters are moved stepwise upwards for alignment of the next section of guide rails.

WO publication 2014/053184 discloses a guide rail straightness measuring system for elevator installations. The measuring system comprises at least one plumb line mounted vertically in the elevator shaft adjacent to the guide rail and at least one sensor arrangement to be mounted on a carrier to travel vertically along the guide rail. The sensor arrangement comprises a frame, at least one guide shoe connected to the frame for sliding or rolling along the guide surface of the guide rail, a bias means for placing and biasing the frame against the guide surface, and at least one sensor means for sensing the position of the plumb line with respect to the frame.

BRIEF DESCRIPTION OF THE INVENTION

An object of the present invention is to present a novel arrangement and method for measuring the position of an installation platform in an elevator shaft.

The invention relates to an arrangement for measuring the position of an installation platform in an elevator shaft as defined in claim 1.

The invention relates also to a method for measuring the position of an installation platform in an elevator shaft as defined in claim 7.

The arrangement for measuring the position of an installation platform in an elevator shaft is characterised in that:

an installation platform is arranged to be movable upwards and downwards in a first direction in the elevator shaft, at least one light source is arranged at a predetermined position in the elevator shaft below the installation platform, said at least one light source producing a vertically upwards directed collimated light beam, at least one primary digital imaging device is arranged on the installation platform, the at least one primary digital imaging device being arranged to take electronic images of the light beam hitting the photosensitive sensor of the at least one primary digital imaging device or of a pattern created by the light beam on a reflective or transparent screen positioned at a distance in front of the photosensitive sensor of the at least one primary digital imaging device, whereby the horizontal position of the installation platform in relation to the elevator shaft can be measured from the electronic images taken by the at least one primary digital imaging device.

The method for measuring the position of an installation platform in an elevator shaft comprises the steps of:

arranging an installation platform to be movable upwards and downwards in a first direction in the elevator shaft, arranging at least one light source at a predetermined position in the elevator shaft below the installation platform, said at least one light source producing a vertically upwards directed collimated light beam, arranging at least one primary digital imaging device on the installation platform, arranging the at least one primary digital imaging device to take electronic images of the light beam hitting the photosensitive sensor of the at least one primary digital imaging device or of a pattern created by the light beam on a reflective or transparent screen positioned at a distance in front of the photosensitive sensor of the at least one primary digital imaging device, whereby the horizontal position of the installation platform in relation to the elevator shaft can be measured from the electronic images taken by the at least one primary digital imaging device.

BRIEF DESCRIPTION OF THE DRAWINGS

The invention will in the following be described in greater detail by means of preferred embodiments with reference to the attached drawings, in which.

DETAILED DESCRIPTION OF EMBODIMENTS OF THE INVENTION

Figure 1:
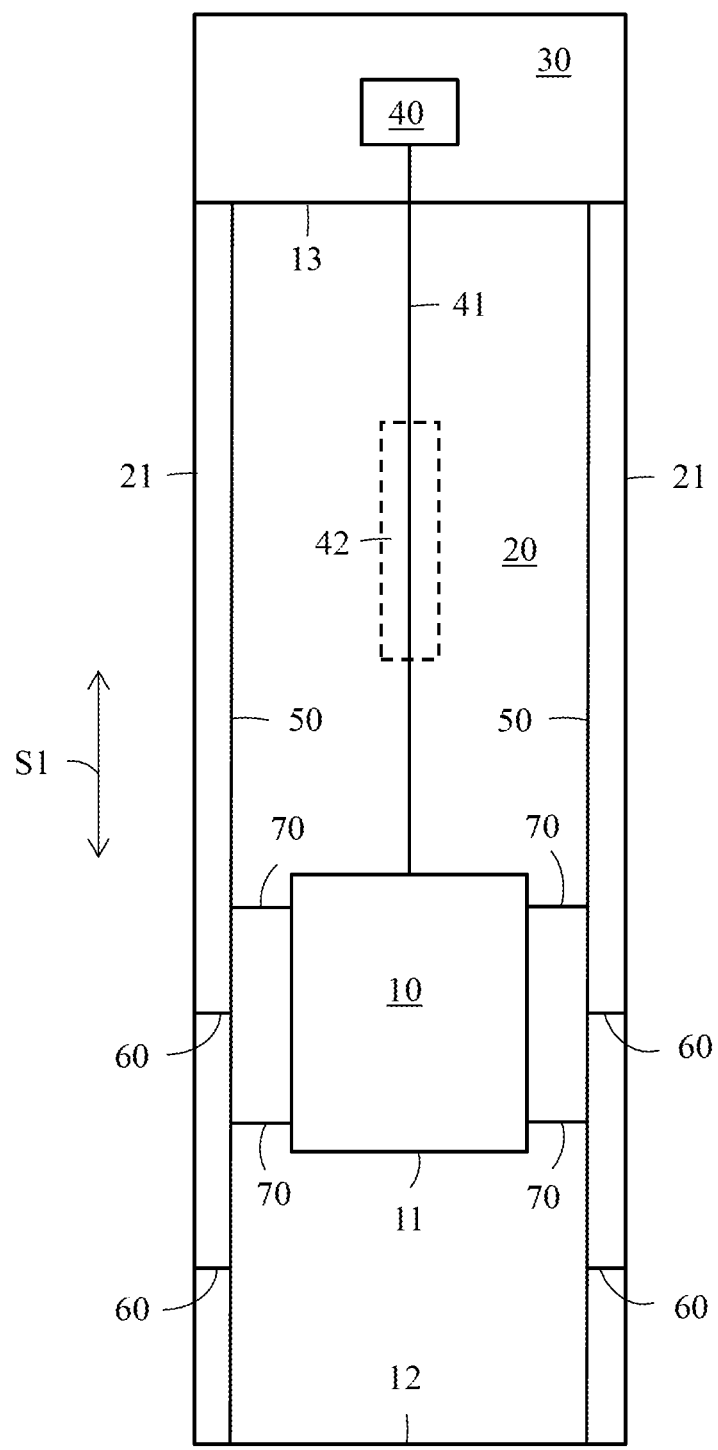
FIG. 1 shows a vertical cross section of an elevator.
Figure 2:
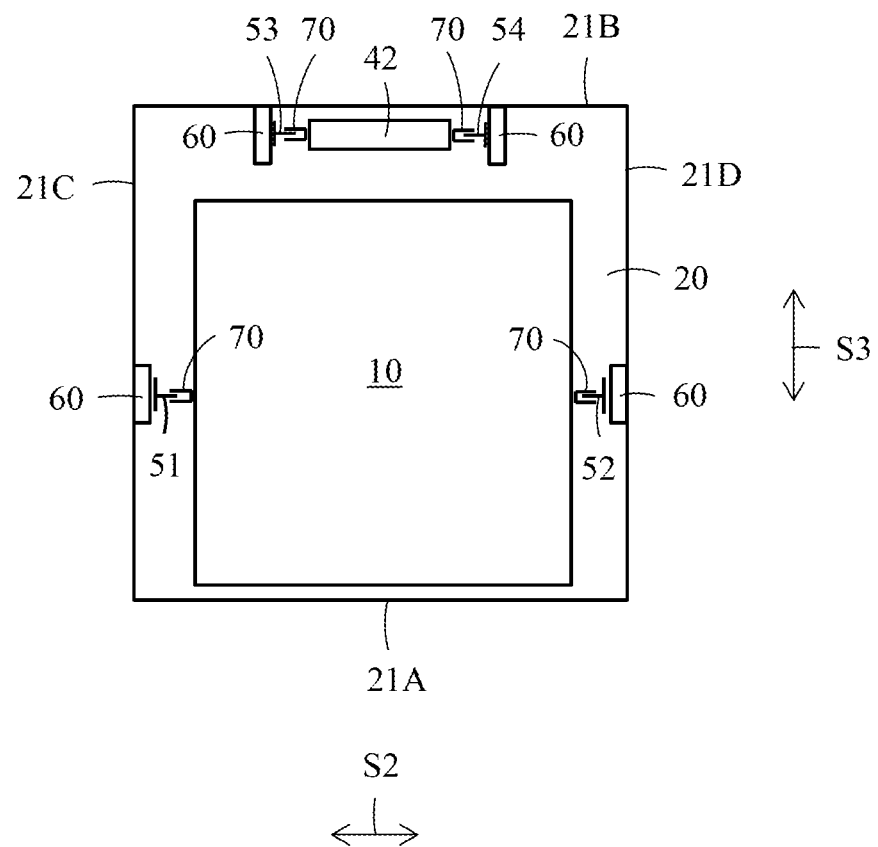
FIG. 2 shows a horizontal cross section of the elevator.

FIG. 1 shows a vertical cross section and FIG. 2 shows a horizontal cross section of an elevator.

The elevator comprises a car 10, an elevator shaft 20, a machine room 30, lifting machinery 40, ropes 41, and a counter weight 42. The car 10 may be supported on a transport frame 11 or a sling surrounding the car 10. The lifting machinery 40 moves the car 10 in a first direction S1 upwards and downwards in a vertically extending elevator shaft 20. The sling 11 and thereby also the elevator car 10 are carried by the ropes 41, which connect the elevator car 10 to the counter weight 42. The sling 11 and thereby also the elevator car 10 is further supported with gliding means 70 at guide rails 50 extending in the vertical direction in the elevator shaft 20. The elevator shaft 20 has a bottom 12, a top 13, a front wall 21A, a back wall 21B, a first side wall 21C and a second opposite side wall 21D. There are two car guide rails 51, 52 positioned on opposite side walls 21C, 21D of the elevator shaft 20. The gliding means 70 can comprise rolls rolling on the guide rails 50 or gliding shoes gliding on the guide rails 50 when the elevator car 10 is mowing upwards and downwards in the elevator shaft 20. There are further two counter weight guide rails 53, 54 positioned at the back wall 21B of the elevator shaft 20. The counter weight 42 is supported with corresponding gliding means 70 on the counter weight guide rails 53, 54. The landing doors (not shown in the figure) are positioned in connection with the front wall 21A of the elevator shaft 20.

Each car guide rail 51, 52 is fastened with fastening means 60 at the respective side wall 21C, 21D of the elevator shaft 20 along the height of the car guide rail 51, 52. Each counter weight guide rail 53, 54 is fastened with corresponding fastening means 60 at the back wall 21B of the elevator shaft 20 along the height of the counter weight guide rail 53, 54. The figure shows only two fastening means 60, but there are several fastening means 60 along the height of each guide rail 50. The cross section of the guide rails 50 can have the form of a letter T. The vertical branch of the guide rail element 50 forms three gliding surfaces for the gliding means 70 comprising rolls or gliding shoes. There are thus two opposite side gliding surfaces and one front gliding surface in the guide rail 50. The cross-section of the gliding means 70 can have the form of a letter U so that the inner surface of the gliding means 70 sets against the three gliding surfaces of the guide rail 50. The gliding means 70 are attached to the sling 11 and/or to the counter weight 42.

The gliding means 70 engage with the guide rails 50 and keep the elevator car 10 and/or the counter weight 42 in position in the horizontal plane when the elevator car 10 and/or the counter weight 42 moves upwards and downwards in the first direction S1 in the elevator shaft 20. The elevator car 10 transports people and/or goods between the landings in the building. The elevator shaft 20 can be formed so that all side walls 21, 21A, 21B, 21C, 21D are formed of solid walls or so that one or several of the side walls 21, 21A, 21B, 21C, 21D are formed of an open steel structure.

The guide rails 50 extend vertically along the height of the elevator shaft 20. The guide rails 50 are thus formed of guide rail elements of a certain length e.g. 5 m. The guide rail elements 50 are installed end-on-end one after the other.

FIG. 1 shows a first direction S1, which is a vertical direction in the elevator shaft 20. FIG. 2 shows a second direction S2, which is the direction between the first side wall 21C and the second side wall 21D in the elevator shaft 20 i.e. the direction between the guide rails (DBG). FIG. 2 shows further a third direction S3, which is the direction between the back wall 21B and the front wall 21A in the elevator shaft 20 i.e. the back to front direction (BTF). The second direction S2 is perpendicular to the third direction S3. The second direction S2 and the third direction S3 form a coordinate system in a horizontal plane in the elevator shaft 20.

Figure 3:
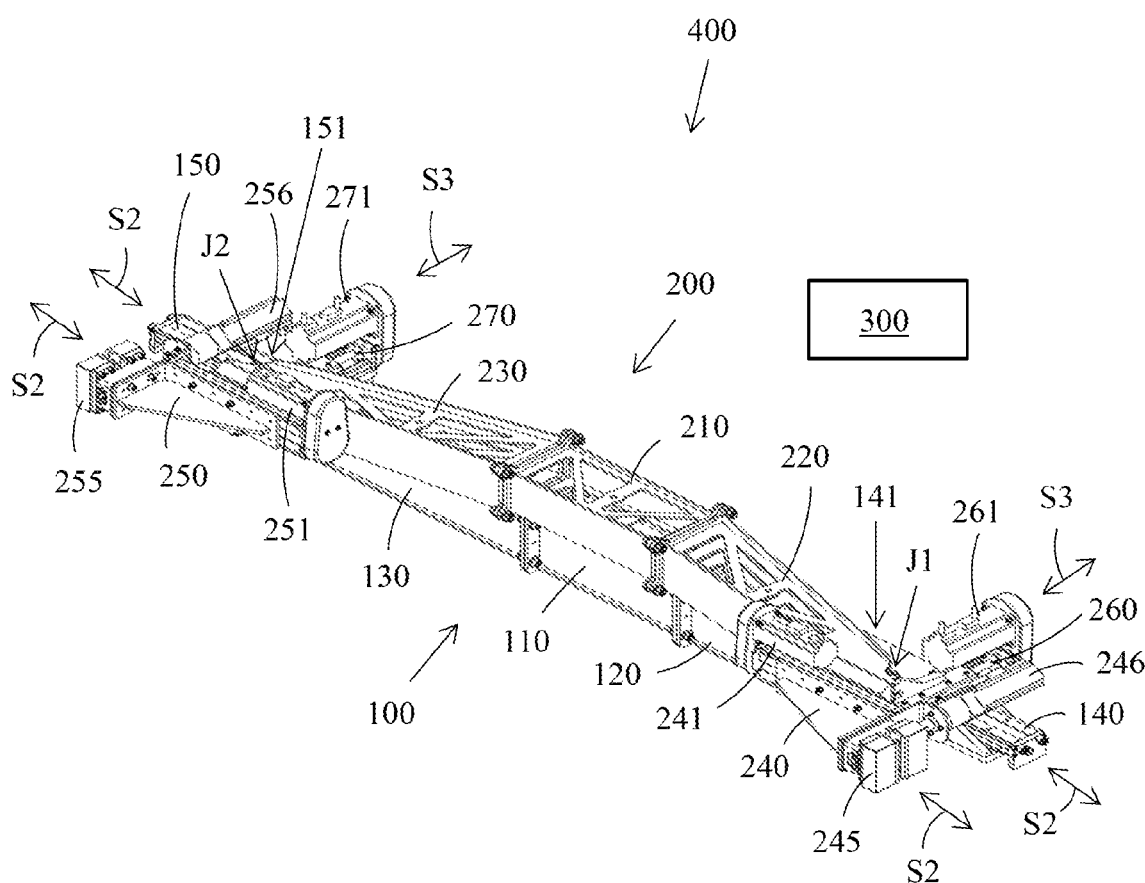
FIG. 3 shows an axonometric view of an apparatus for aligning guide rails in an elevator shaft.

FIG. 3 shows an axonometric view of an apparatus for aligning guide rails in an elevator shaft. The apparatus 400 for aligning guide rails 50 comprises a positioning unit 100 and an alignment unit 200.

The positioning unit 100 comprises a longitudinal support structure with a middle portion 110 and two opposite end portions 120, 130. The two opposite end portions 120, 130 are mirror images of each other. There could be several middle portions 110 of different lengths in order to adjust the length of the positioning unit 100 to different elevator shafts 20. The positioning unit 100 comprises further first attachment means 140, 150 at both ends of the positioning unit 100. The first attachment means 140, 150 are movable in the second direction S2 i.e. the direction between the guide rails (DBG). The positioning unit 100 extends across the elevator shaft 20 in the second direction S2. The first attachment means 140, 150 are used to lock the positioning unit 100 between the wall structures 21 and/or dividing beams and/or brackets 60 in the elevator shaft 20. An actuator 141, 151 (position shown only schematically in the figure) e.g. a linear motor in connection with each of the first attachment means 140, 150 can be used to move each of the first attachment means 140, 150 individually in the second direction S2.

The alignment unit 200 comprises a longitudinal support structure with a middle portion 210 and two opposite end portions 220, 230. The two opposite end portions 220, 230 are mirror images of each other. There could be several middle portions 210 of different lengths in order to adjust the length of the alignment unit 200 to different elevator shafts 20. The alignment unit comprises further second attachment means 240, 250 at both ends of the alignment unit 200. The second attachment means 240, 250 are movable in the second direction S2. An actuator 241, 251 e.g. a linear motor can be used to move each of the second attachment means 240, 250 individually in the second direction S2. Each of the second attachment means 240, 250 comprises further gripping means in the form of jaws 245, 255 positioned at the end of the second attachment means 240, 250. The jaws 245, 255 are movable in the third direction S3 perpendicular to the second direction S2. The jaws 245, 255 will thus grip on the opposite side surfaces of the guide rails 50. An actuator 246, 256 e.g. a linear motor can be used to move each of the jaws 245, 255 individually in the third direction S3. The alignment unit 200 is attached to the positioning unit 100 at each end of the positioning unit 100 with support parts 260, 270. The support parts 260, 270 are movable in the third direction S3 in relation to the positioning unit 100. The alignment unit 200 is attached with articulated joints J1, J2 to the support parts 260, 270. An actuator 261, 271 e.g. a linear motor can be used to move each of the support parts 260, 270 individually in the third direction S3. The articulated joints J1, J2 make it possible to adjust the alignment unit 200 so that it is non-parallel to the positioning unit 100.

The two second attachment means 240, 250 are moved with the actuators 241, 251 only in the second direction S2. It would, however, be possible to add a further actuator to one of the second attachment means 240, 250 in order to be able to turn said second attachment means 240, 250 in the horizontal plane around an articulated joint. It seems that such a possibility is not needed, but such a possibility could be added to the apparatus 500 if needed.

The apparatus 400 can be operated automatically by means of a control unit 300. The control unit 300 can be attached to the apparatus 400 or it can be a separate entity that is connectable with a cable to the apparatus 400. There can naturally also be a wireless communication between the control unit 300 and the apparatus 400. The control unit 300 is used to control all the actuators 141, 142 moving the first attachment means 140, 150, the actuators 241, 242 moving the second attachment means 240, 250, the actuators 246, 256 moving the gripping means 245, 255 and the actuators 261, 271 moving the support parts 260, 270.

Figure 4:
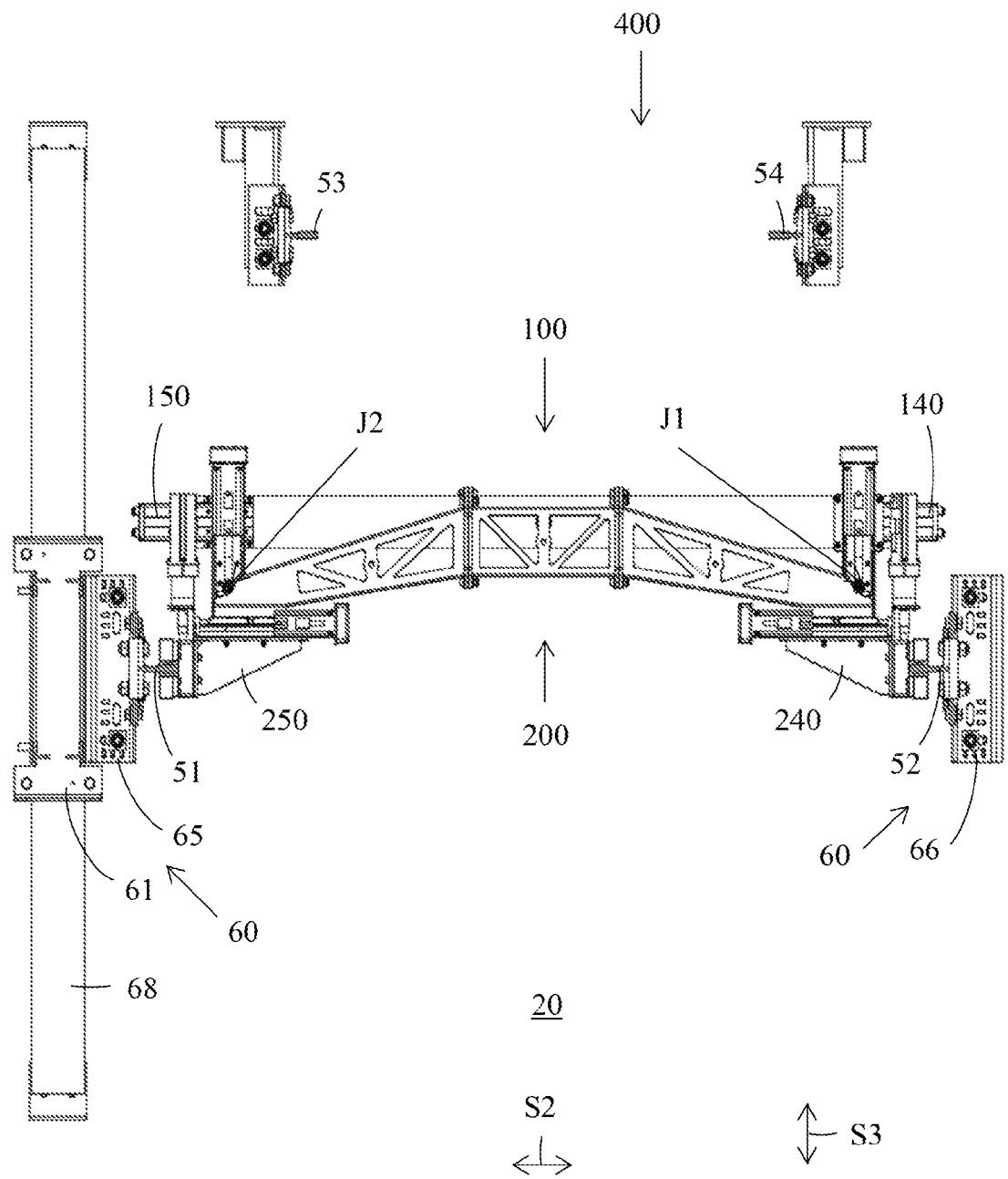
FIG. 4 shows a first phase of the operation of the apparatus of FIG. 3.

FIG. 4 shows a first phase of the operation of the apparatus of FIG. 3. The guide rails 51, 52 are attached to brackets 65, 66 and the brackets 65, 66 can be attached directly to the side wall 21C of the shaft 20 or through a support bar 68 extending between the back wall 21B and the front wall 21A of the shaft 20. The bracket 65 is attached to a bar bracket 61 and the bar bracket 61 is attached to the support bar 68. The apparatus 400 can be supported on an installation platform and lifted with the installation platform to a height location of the first fastening means 60 during the alignment of the guide rails 50. The apparatus 400 may be operated automatically be means of the control unit 300 so that the alignment unit 200 is controlled to attach with the jaws 245, 255 at the ends of the second attachment means 240, 250 to the two opposite guide rails 51, 52. The second attachment means 240, 250 are movable in the second direction S2 and the jaws 245, 255 are movable in the third direction S3 so that they can grip on the opposite vertical side surfaces of the guide rails 51, 52. The brackets bolts between the two parts in the brackets 60 are then opened at both sides of the shaft 20 so that the guide rails 51, 52 can be moved. The guide rails 51, 52 on opposite sides of the shaft 20 are then adjusted relative to each other with the alignment unit 200. The frame of the alignment unit 200 is stiff so that the two opposite guide rails 51, 52 will be positioned with the apexes facing towards each other when the gripping means 245, 255 grips the guide rails 50. There is thus no twist between the opposite guide rails 50 after this. The distance between the two opposite guide rails 50 in the direction (DBG) is also adjusted with the alignment unit 200. The position of each of the second attachment means 240, 250 in the second direction S2 determines said distance.

There is a plumb line formed in the vicinity of each guide rail 51, 52 (not shown in the figure). The distance in the DBG and the BTF direction from the guide rails 51, 52 to the respective plumb line that is in the vicinity of said guide rail 51, 52 is then determined. The needed control values (DBG, BTF and twist) for the apparatus 400 are then calculated. The control values are then transformed into incremental steps, which are fed as control signals to the control units of the linear motors in the apparatus 400. The DBG can also be measured based on the motor torque, which indicates when the second attachment means 240, 250 have reached their end position and are positioned against the guide rails 50. The position of the linear motors can then be read from the display of the control unit 300. The apparatus 400 can thus calculate the DBG based on the distance of the guide rails 51, 52 to the plumb lines and based on the position of each of the second attachment means 240, 250 in the second direction S2.

Figure 5:
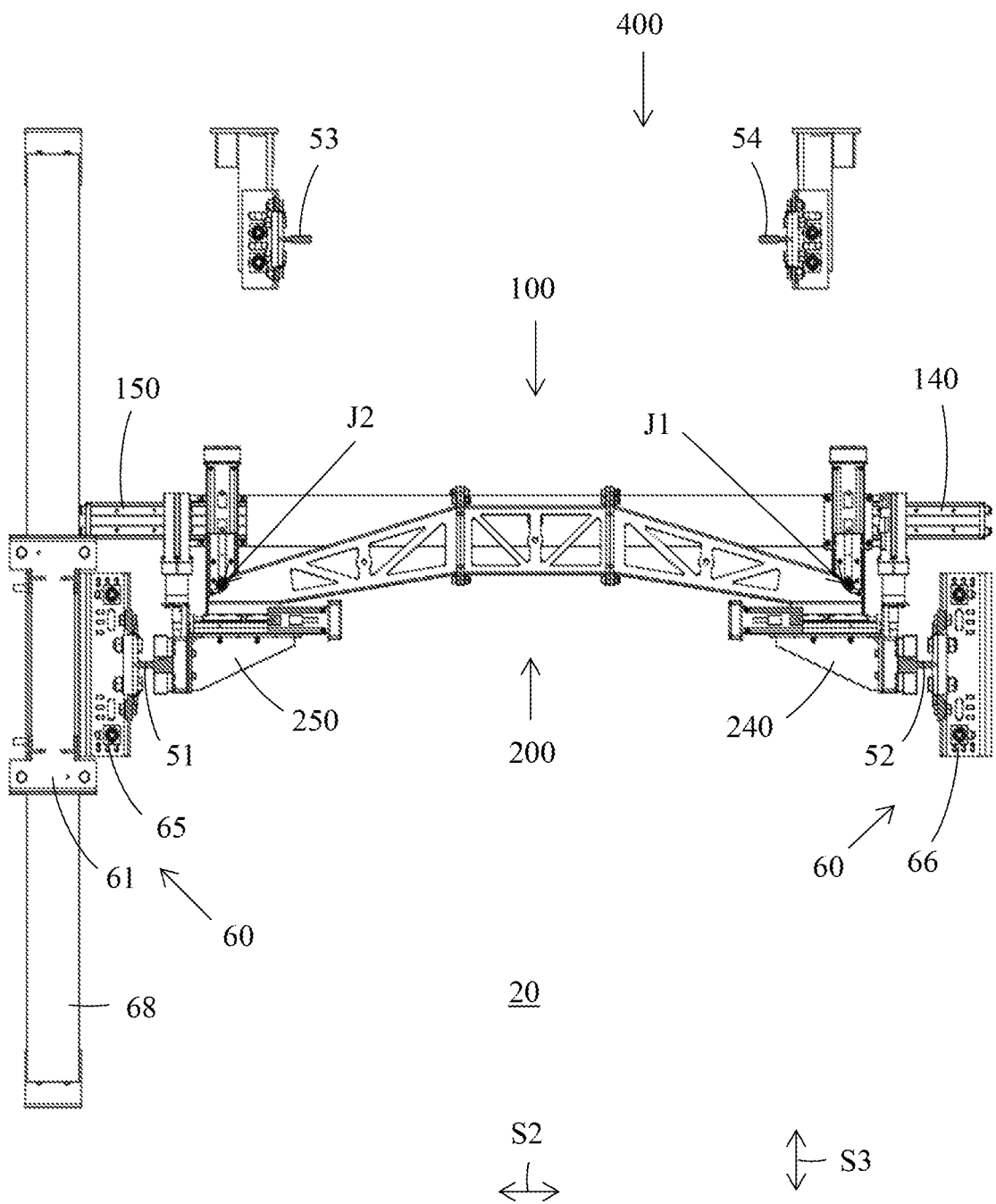
FIG. 5 shows a second phase of the operation of the apparatus of FIG. 3.

FIG. 5 shows a second phase of the operation of the apparatus of FIG. 3. The positioning unit 100 of the apparatus 400 is locked to the wall constructions 21 or other support structures in the elevator shaft 20 with the first attachment means 140, 150. The alignment unit 200 of the apparatus 400 is in a floating mode in relation to the positioning unit 100 when the positioning unit 100 is locked to the wall construction 21 of the elevator shaft 20. The guide rails 51, 52 can now be adjusted with the alignment unit 200 and the positioning unit 100 in relation to the shaft 20. The bracket bolts between the two bracket parts are then tightened. The apparatus 400 can now be transported to the next bracket location where the first phase and the second phase of the operation of the apparatus 400 is repeated.

Figure 6:
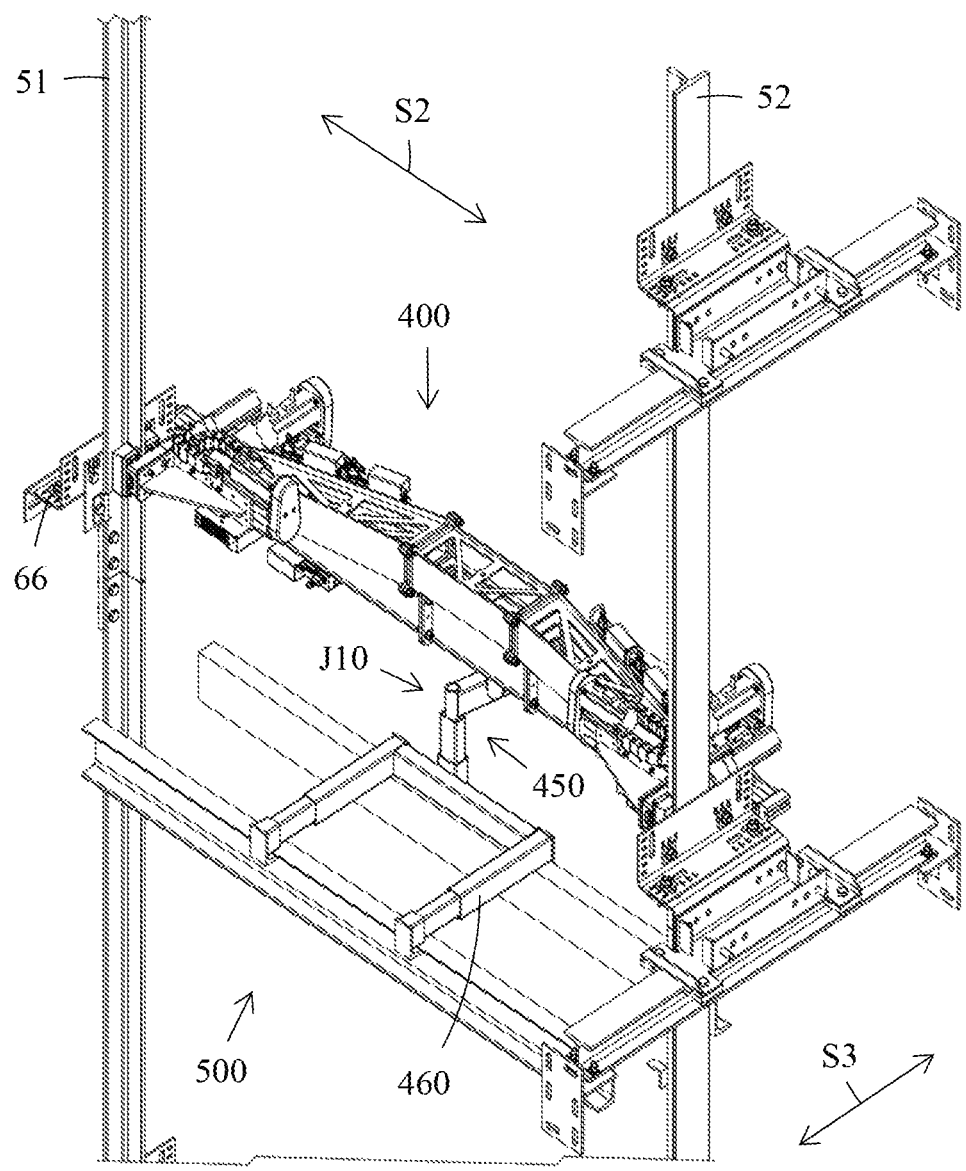
FIG. 6 shows an axonometric view of an elevator shaft with the alignment apparatus and the installation platform.

FIG. 6 shows an axonometric view of an elevator shaft with the alignment apparatus and the installation platform. The figure shows the car guide rails 51, 52, the installation platform 500 and the apparatus 400 for aligning the guide rails 51, 52. The apparatus 400 for aligning the guide rails 51, 52 is attached with a support arm 450 to a support frame 460 and the support frame 460 is attached to the installation platform 500. The apparatus 400 for aligning the guide rails 51, 52 has to be movable in the second direction S2 and in the third direction S3 in relation to the installation platform 500. This can be achieved with one or several joints J10 in the support arm 450. The support frame 460 can also be arranged to be movable in the second direction S2 and in the third direction S3. The position of the support arm 450 in relation to the installation platform 500 must be measured in order to determine the position of the alignment apparatus 400 in relation to the installation platform 500.

Figure 7:
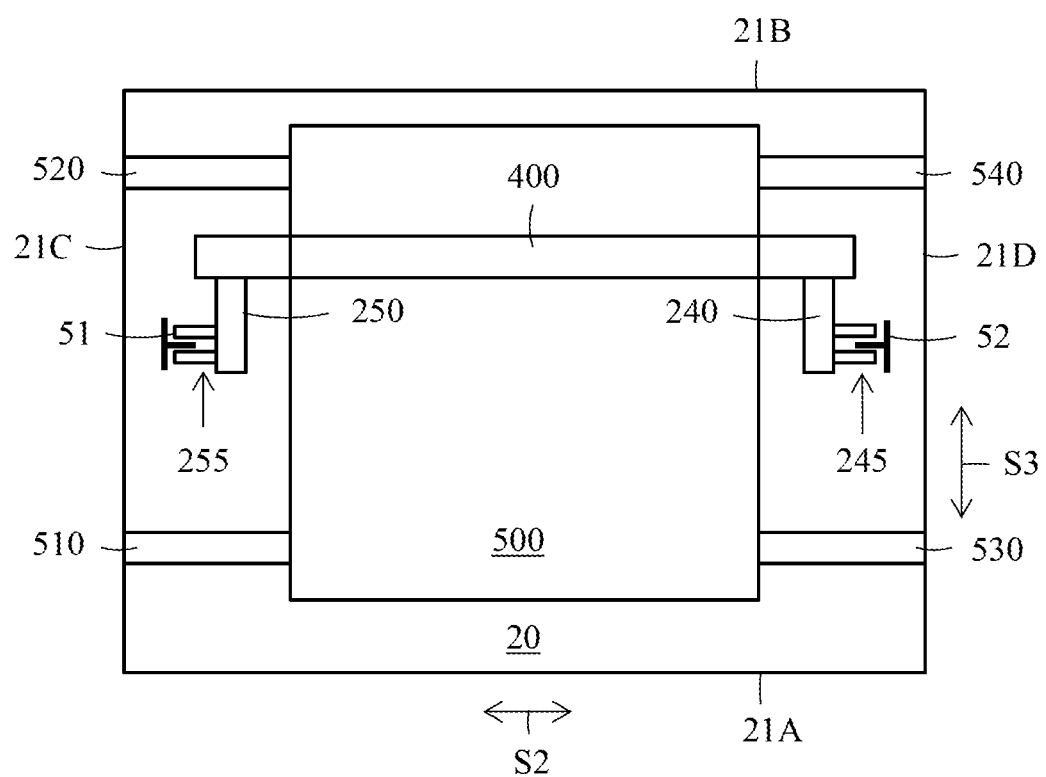
FIG. 7 shows a vertical cross section of an elevator shaft with the alignment apparatus and the installation platform.

FIG. 7 shows a horizontal cross section of the elevator shaft with the alignment apparatus and the installation platform. The figure shows the installation platform 500 and the apparatus 400 for aligning guide rails. The installation platform 500 comprises support arms 510, 520, 530, 540 arranged on opposite sides of the installation platform 500 and being movable in a second direction S2 for supporting the installation platform 500 on the opposite side walls 21C, 21D of the shaft 20. The gripping means 245, 255 of the second attachment means 240, 250 can grip the opposite guide surfaces of the car guide rails 51, 52. The car guide rails 51, 52 can thus be aligned with the apparatus 400 for alignment of guide rails as described earlier in connection with FIGS. 3-5. The installation platform 500 is locked in place with the support arms 510, 520, 530, 540. The alignment apparatus 400 is attached to the installation platform 500, whereby the position of the apparatus 400 can be determined indirectly based on the position of the installation platform 500. The position of the guide rails 51, 52 can be determined indirectly based on the position of the apparatus 400.

The installation platform 500 may be provided with different installation equipment in addition to the apparatus 400 for aligning guide rails. The installation equipment may be used to install doors and guide rails. The installation equipment may comprise one or several robots being movable on the installation platform 500. The installation platform 500 may be supported with gliding means on the opposite car guide rails 51, 52 during the movement in the first direction S1 upwards and downwards in the elevator shaft 20. A hoist may be used to move the installation platform 500 in the first direction S1 upwards and downwards in the elevator shaft 20. The position of all installation equipment on the installation platform 500 can be determined once the position of the installation platform 500 in relation to the elevator shaft 20 has been determined. The installation equipment may be attached stationary to the installation platform 500 or the installation equipment may be attached to be movable on the installation platform 500. In case the installation equipment is movable on the installation platform 500, then a sensor system is needed in order to be able to determine the position of the installation equipment on the installation platform 500. The movement of the gripping means etc. in the installation equipment is naturally known in relation to the fastening point of the installation equipment all the time.

Figure 8:
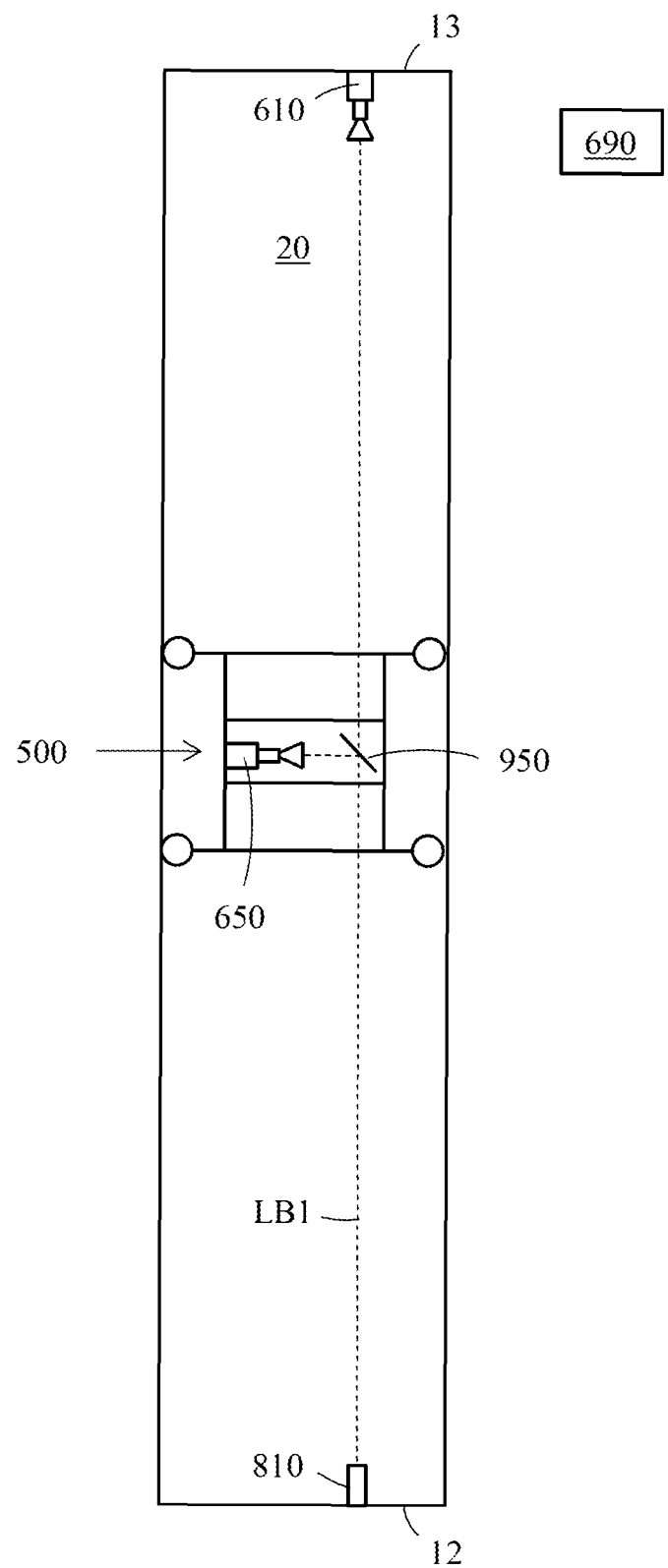
FIG. 8 shows a vertical cross section of the elevator shaft showing a first embodiment of the invention.

FIG. 8 shows a vertical cross section of the elevator shaft showing a first embodiment of the invention. A collimated light source, e.g. a laser 810 is positioned on the floor 12 of the elevator shaft 20, a primary digital imaging device 650 is positioned on the installation platform 500, a beam splitter 950 is positioned on the installation platform 500, and a secondary digital imaging device 610 is positioned on the ceiling 13 of the elevator shaft 20. The beam splitter 950 splits the light beam LB1 produced by the light source 810 into two portions, whereby a first portion passes directly vertically upwards through the beam splitter 950 to the secondary digital imaging device 610 and a second portion is turned 90 degrees towards the primary digital imaging device 650. The light source 810 produces a collimated light beam LB1 upwards in the elevator shaft 20 along a predetermined vertical installation line in the elevator shaft 20. The primary digital imaging device 650 is stationary in relation to the installation platform 500. The secondary digital imaging device 610 is stationary in relation to the ceiling 13 of the elevator shaft 20. The light beam LB1 is directed through the beam splitter 950 in the installation platform 500. The primary digital imaging device 650 looks at the portion of the light beam that has been turned 90 degrees by the beam splitter 950. The secondary digital imaging device 610 looks at the portion of the light beam LB1 that passes directly through the beam splitter 950.

A reflective or transparent screen is advantageously positioned at a distance in front of the primary digital imaging device 650 and at a distance in front of the secondary digital imaging device 610. The primary digital imaging device 650 and the secondary digital imaging device 610 can take electronic images of either the light beam LB1, LB2 hitting the photosensitive sensor of digital imaging device 650, 610 or of a pattern created by the light beam LB1, LB2 on the reflective or transparent screen positioned at a distance in front of the photosensitive sensor of the digital imaging device 650, 610. The screen can easily be made much bigger than the photosensitive sensor of the digital imaging device 650, 610 making the possible hitting area for the light beam LB1, LB2 much bigger. The distance between the screen and the photosensitive sensor of the digital imaging device 650, 610 could be in the order of 5 to 20 cm.

The deviation of the installation platform 500 in the elevator shaft 20 in relation to the vertical installation line can be determined from the electronic images taken by the primary digital imaging device 650. The changes in the position of the light beam LB1 on the photosensitive sensor of the primary digital imaging device 650 or in the pattern created by the light beam LB1 on the reflective or transparent screen positioned at a distance in front of photosensitive sensor of the primary digital imaging device 650 correlates with the position of the installation platform 500 in the elevator shaft 20. The movement of the top 13 of the elevator shaft 20 can be determined from the electronic images taken by the secondary digital imaging device 610. The changes in the position of the light beam LB1 on the photosensitive sensor of the secondary digital imaging device 610 or in the pattern created by the light beam LB1 on the reflective or transparent screen positioned at a distance in front of photosensitive sensor of the secondary digital imaging device 610 correlates with the bending of the elevator shaft 20.

Figure 9:
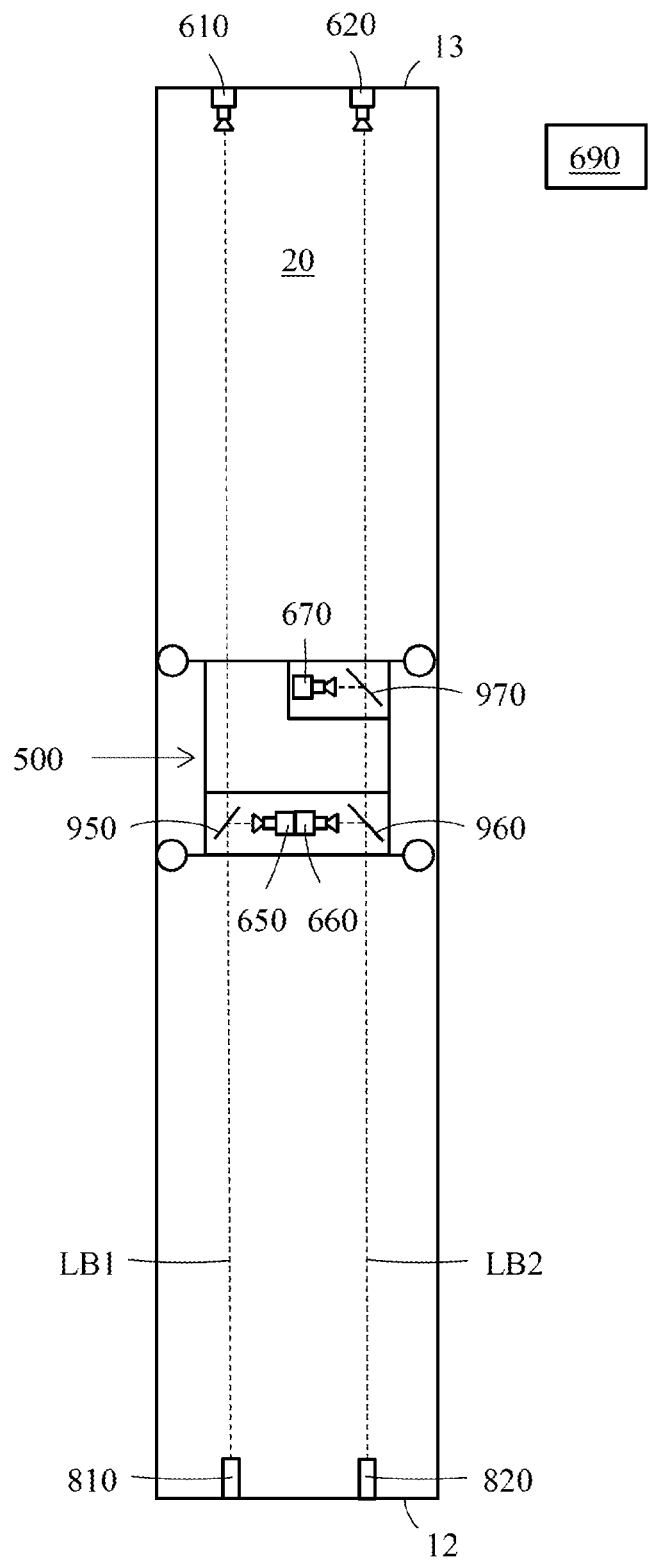
FIG. 9 shows a vertical cross section of the elevator shaft showing a second embodiment of the invention.

FIG. 9 shows a vertical cross section of the elevator shaft showing a second embodiment of the invention. Two collimated light sources, e.g. lasers 810, 820 are positioned on the floor 12 of the elevator shaft 20, three primary digital imaging devices 650, 660, 670 are positioned on the installation platform 500, three beam splitters 950, 960, 970 are positioned on the installation platform 500, and two secondary digital imaging devices 610, 620 are positioned on the ceiling 13 of the elevator shaft 20. Each light source 810, 820 produce a collimated light beam LB1, LB2 upwards in the elevator shaft 20 along a predetermined vertical installation line in the elevator shaft 20. The three primary digital imaging devices 650, 660, 670 are stationary in relation to the installation platform 500. The two secondary digital imaging devices 610, 620 are stationary in relation to the ceiling 13 of the elevator shaft 20. Two 650, 660 of the three primary digital imaging devices 650, 660, 670 are positioned on the same horizontal line on the installation platform 500. The third 670 of the three primary digital imaging devices 650, 660, 670 is positioned vertically at a higher level in the installation platform 500 compared to the first two 650, 660 of the three primary digital imaging devices 650, 660, 670. The first light beam LB1 is directed through a first beam splitter 950 in the installation platform 500. The first beam splitter 950 splits the first light beam LB1 produced by the first light source 810 into two portions, whereby a first portion passes vertically upwards directly through the first beam splitter 950 and a second portion is turned 90 degrees towards a first 650 of the three primary digital imaging devices 650, 660, 670. The second light beam LB2 is directed through a second beam splitter 960 and a third beam splitter 970 in the installation platform 500. The second beam splitter 960 splits the second light beam LB2 produced by the second light source 820 into two portions, whereby a first portion passes vertically upwards directly through the second beam splitter 960 and a second portion is turned 90 degrees towards a second 660 of the three primary digital imaging devices 650, 660, 670. The third beam splitter 970 is positioned on a vertical line above the second beam splitter 960. The third beam splitter 970 splits the second light beam LB2 produced by the second light source 820 into two portions, whereby a first portion passes vertically upwards directly through the third beam splitter 970 and a second portion is turned 90 degrees towards a third 670 of the three primary digital imaging devices 650, 660, 670.

The first 650 of the three primary digital imaging devices 650, 660, 670 looks at the deviated portion of the first light beam LB1 received from the first beam splitter 950. The second 660 of the three primary digital imaging devices 650, 660, 670 looks at the deviated portion of the second light beam LB2 received from the second beam splitter 960. The third 670 of the three primary digital imaging devices 650, 660, 670 looks at the second light beam LB2 received from the third beam splitter 970. The horizontal position of the installation platform 500 in relation to the elevator shaft 20 in the second direction S2 and in the third direction S3 can be determined from the electronic images of the two lowermost primary digital imaging devices 650, 660. The tilt or the deviation of the installation platform 500 in relation to a vertical reference line can be determined from the electronic images taken by the second 660 and the third 670 of the three primary digital imaging devices 650, 660, 670.

The first 610 of the two secondary digital imaging devices 610, 620 looks at the portion of the first light beam LB1 that passes directly straight upwards through the first beam splitter 950. The second 620 of the two secondary digital imaging devices 610, 620 looks at the portion of the second light beam LB2 that passes directly straight upwards through the second beam splitter 960 and the third beam splitter 970. The movement of the top 13 of the elevator shaft 20 can be determined from the electronic images taken by the two secondary digital imaging devices 610, 620.

A reflective or transparent screen is advantageously positioned at a distance in front of each of the three primary digital imaging devices 650, 660, 670 and at a distance in front of each of the secondary digital imaging devices 610, 620. The primary digital imaging devices 650, 660, 670 and the secondary digital imaging devices 610, 620 can take electronic images of either the light beam LB1, LB2 hitting the photosensitive sensor of the digital imaging device 650, 660, 670, 610, 620 or of a pattern created by the light beam LB1, LB2 on the reflective or transparent screen positioned at a distance in front of the photosensitive sensor of the digital imaging device 650, 660, 670, 610, 620. The screen can easily be made much bigger than the photosensitive sensor of the digital imaging device 650, 660, 670, 610, 620 making the possible hitting area for the light beam LB1, LB2 much bigger. The distance between the screen and the photosensitive sensor of the digital imaging device 650, 660, 670, 610, 620 could be in the order of 5 to 20 cm.

The FIGS. 8-9 also show a main control unit 690 through which the operation of the alignment tool 400 and the other installation equipment on the installation platform 500 can be controlled. The main control unit 690 receives the measurement information from the primary digital imaging devices 650, 660, 670 and the secondary digital imaging devices 610, 620 used in the invention.

The arrangement for aligning guide rails has been described in connection with car guide rails 51, 52, but the arrangement can naturally also be used to align counter weight guide rails 52, 53.

The transfer of information and control data between the main control unit 690 and the control unit 300 may be by wireless communication or by wire. The transfer of information and control data between the installation platform 500 and the control unit 300 and between the apparatus for alignment 400 and the control unit 300 may be by wireless communication or by wire.

The light sources 810, 820 should be positioned so that the light beams LB1, LB2 can pass freely upwards in the elevator shaft 20 to the top 13 of the shaft 20.

The position of the installation platform 500 in relation to the elevator shaft 20 can be determined in accordance with FIGS. 8-9. The position of the alignment tool 400 and the position of all the other installation equipment on the installation platform 500 in relation to the installation platform 500 must be known, whereby the position of the alignment tool 400 and the position of all the other installation equipment on the installation platform 500 can be determined in relation to the elevator shaft 20.

The use of laser beams LB1, LB2 as plumb lines is advantageous compared to the use of mechanical plumb lines. Mechanical plumb lines are formed by wires, which start to vibrate immediately when they are touched by accident. The measurements have to be interrupted until the wire stops vibrating.

The secondary digital imaging devices 610, 620 shown in FIGS. 8 and 9 are not necessary in the invention. They are only needed in order to be able to determine the possible bending of the elevator shaft 20. The possible bending of the shaft has to be taken into account only in high rise buildings.

The light sources 810, 820 are positioned on the floor 12 of the elevator shaft 20 and the secondary digital imaging devices 610, 620 are positioned on the ceiling 13 of the elevator shaft 20 in FIGS. 8 and 9. The range of the light sources 810, 820 might cause limitations in a very high rise building, whereby the light sources 810, 820 could be raised gradually to higher positions in the elevator shaft 20 as the installation advances upwards in the elevator shaft 20. It would also be possible to position the secondary digital imaging devices 610, 620 initially at a lower level under the ceiling 13 of the elevator shaft 20 and then raise the secondary digital imaging devices 610, 620 gradually to higher positions in the elevator shaft 20 as the installation advances upwards in the elevator shaft 20. The light sources 810, 820 must naturally in all situations be positioned below the installation platform 500 and the secondary digital imaging devices 610, 620 must in all situations be positioned above the installation platform 500.

The arrangement and the method can be used in elevator installations where the hoisting height in the elevator shaft is over 30 mm, preferably 30-80 meters, most preferably 40-80 meters.

The arrangement and the method can on the other hand also be used in elevator installations where the hoisting height in the elevator shaft is over 75 meters, preferably over 100 meters, more preferably over 150 meters, most preferably over 250 meters.

The installation platform 500 can be used to install car guide rails 51, 52 and/or counter weight guide rails 53, 54.

The use of the invention is not limited to the type of elevator disclosed in the figures. The invention can be used in any type of elevator e.g. also in elevators lacking a machine room and/or a counterweight. The counterweight is in the figures positioned on the back wall of the elevator shaft. The counterweight could be positioned on either side wall of the shaft or on both side walls of the elevator shaft. The lifting machinery is in the figures positioned in a machine room at the top of the elevator shaft. The lifting machinery could be positioned at the bottom of the elevator shaft or at some point within the elevator shaft.

It will be obvious to a person skilled in the art that, as the technology advances, the inventive concept can be implemented in various ways. The invention and its embodiments are not limited to the examples described above but may vary within the scope of the claims.

The invention claimed is:

1. A system for measuring a horizontal position of an installation platform in an elevator shaft, the installation platform being movable in a first direction in the elevator shaft, the system comprising:
   at least one light source at a position in the elevator shaft below the installation platform, the at least one light source configured to emit a vertically upwards directed collimated light beam; and
   at least one primary digital imaging device on the installation platform, the at least one primary digital imaging device configured to capture electronic images of one of (i) the light beam hitting a photosensitive sensor of the at least one primary digital imaging device, and (ii) a pattern created by the light beam on a reflective or transparent screen positioned at a distance in front of the photosensitive sensor, wherein
      the horizontal position of the installation platform in relation to the elevator shaft is measurable from the electronic images.

2. The system of claim 1, further comprising:
   at least one secondary digital imaging device at a position on a vertical line above the at least one light source in the elevator shaft, wherein
      at least one beam splitter is at a position on the vertical line, the at least one beam splitter configured to divide the light beam into a first portion and a second portion such that the first portion of the light beam passes directly vertically upwards through the at least one beam splitter to the at least one secondary digital imaging device and the second portion of the light beam is turned 90 degrees towards the at least one primary digital imaging device,
      the at least one primary digital imaging device is configured to capture the electronic images such that the electronic images are of one of (i) the second portion of the light beam hitting the photosensitive sensor of the at least one primary digital imaging device and (ii) a pattern created by the light beam on a reflective or transparent screen positioned at a distance in front of the photosensitive sensor of the at least one primary digital imaging device, the electronic images captured by the at least one primary digital imaging device providing an indication of the horizontal position of the installation platform in relation to the elevator shaft, and
      the at least one secondary digital imaging device is configured to capture the electronic images such that the electronic images are of one of (i) the first portion of the light beam hitting the photosensitive sensor of the at least one secondary digital imaging device and (ii) a pattern created by the first portion of the light beam on a reflective or transparent screen positioned at a distance in front of the photosensitive sensor of the at least one secondary digital imaging device, the electronic images taken by the at least one secondary digital imaging device providing an indication of an amount of bending of the elevator shaft.

3. The system of claim 1, wherein the at least one light source includes two light sources including a first light source and a second light source at positions in the elevator shaft below the installation platform, the first light source configured to produce a vertically upwards directed collimated first light beam and second light source configured to produce a vertically upwards directed collimated second light beam, the at least one primary digital imaging device includes three primary digital imaging devices on the installation platform, and the system further comprises:
   a beam splitter on the installation platform in a position on a vertical line above the second light source, the beam splitter configured to divide the second light beam into a first portion and a second portion such that the first portion passes directly vertically upwards through the beam splitter to a third of the three primary digital imaging devices and the second portion is turned 90 degrees towards a second of the three primary digital imaging devices, wherein
      a first of the three primary digital imaging device is configured to capture the electronic images of one of (i) the first light beam hitting the photosensitive sensor of the first of the three primary digital imaging devices and (ii) a pattern created by the first light beam on a reflective or transparent screen positioned at a distance in front of the photosensitive sensor of the first of the three primary digital imaging devices,
      a second of the three primary digital imaging device is configured to capture the electronic images of one of (i) the second portion of the second light beam hitting the photosensitive sensor of the second of the three primary digital imaging devices and (ii) a pattern created by the second portion of the second light beam on a reflective or transparent screen positioned at a distance in front of the photosensitive sensor of the second of the three primary digital imaging devices,
      a third of the three primary digital imaging device is configured to capture the electronic images of one of (i) the first portion of the second light beam hitting the photosensitive sensor of the third of the three primary digital imaging devices and (ii) a pattern created by the first portion of the second light beam on a reflective or transparent screen positioned in front of the photosensitive sensor of the third of the three primary digital imaging devices,
      the electronic images captured by the first and the second of the three primary digital imaging devices, which are on a same horizontal level as the installation platform, providing an indication of the horizontal position of the installation platform in relation to the elevator shaft, and
      the electronic images captured by the second and the third of the three primary digital imaging devices, which are above each other on the installation platform, providing an indication of a tilt of the installation platform in relation to the elevator shaft.

4. The system of claim 3, further comprising:
   two secondary digital imaging devices each at a position on a vertical line above the respective light source in the elevator shaft and above the installation platform; and
   three beam splitters including a first beam splitter, a second beam splitter, and a third beam splitter, the first beam splitter being on the installation platform in a position on the vertical line above the first light source, the first beam splitter configured to divide the first light beam into a first portion and a second portion such that the first portion passes directly vertically upwards through the first beam splitter to the first of the two secondary digital imaging devices and the second portion is turned 90 degrees towards the first of the three primary digital imaging devices, the second beam splitter being the beam splitter above the second light source, and the third beam splitter being on the installation platform on a vertical line above the second beam splitter, the third beam splitter configured to divide the portion of the second light beam that passes directly vertically upwards through the second beam splitter into a first portion and a second portion such that first portion passes directly vertically upwards through the third beam splitter to the second of the two secondary digital imaging devices and the second portion is turned 90 degrees towards the second of the three primary digital imaging devices, wherein a first of the two secondary digital imaging devices is configured to capture electronic images of one of (i) the first portion of the first light beam hitting the photosensitive sensor of the first of the two secondary digital imaging devices and (ii) a pattern created by the first portion of the first light beam on a reflective or transparent screen positioned at a distance in front of the photosensitive sensor of the first of the two secondary digital imaging devices, a second of the two secondary digital imaging devices is configured to capture electronic images of one of (i) the portion of the second light beam that passes directly vertically upwards through the second beam splitter and the third beam splitter and hits the photosensitive sensor of the second of the two secondary digital imaging devices and (ii) a pattern created by the first portion of the second light beam on a reflective or transparent screen positioned at a distance in front of the photosensitive sensor of the second of the two secondary digital imaging devices, and the electronic images captured by the two secondary digital imaging devices provide an indication of an amount of bending of the elevator shaft.

5. A method for measuring a horizontal position of an installation platform in an elevator shaft, the installation platform being movable in a first direction in the elevator shaft, the method comprising:

arranging at least one light source at a position in the elevator shaft below the installation platform, the at least one light source configured to emit a vertically upwards directed collimated light beam;

arranging at least one primary digital imaging device on the installation platform; and capturing, via the at least one primary digital imaging device, electronic images of one of (i) the light beam hitting a photosensitive sensor of the at least one primary digital imaging device and (ii) a pattern created by the light beam on a reflective or transparent screen positioned at a distance in front of the photosensitive sensor of the at least one primary digital imaging device, wherein the horizontal position of the installation platform in relation to the elevator shaft is measurable from the electronic images.

6. The method of claim 5, further comprising:

arranging at least one secondary digital imaging device at a position on a vertical line above the at least one light source in the elevator shaft;

arranging at least one beam splitter at a position on the vertical line, the at least one beam splitter configured to divide the light beam into a first portion and a second portion such that the first portion of the light beam passes directly vertically upwards through the at least one beam splitter to the at least one secondary digital imaging device and the second portion of the light beam is turned 90 degrees towards the at least one primary digital imaging device; and capturing, via the at least one secondary digital imaging device, electronic images of one of (i) the first portion of the light beam hitting the photosensitive sensor of the at least one secondary digital imaging device, and (ii) a pattern created by the first portion of the light beam on a reflective or transparent screen positioned at a distance in front of the photosensitive sensor of the at least one secondary digital imaging device, the electronic images captured by the at least one secondary digital imaging device providing an indication of an amount of bending of the elevator shaft, wherein the capturing the electronic images via the at least one primary digital imaging device captures the electronic images of one of (i) the second portion of the light beam hitting the photosensitive sensor of the at least one primary digital imaging device, and (ii) a pattern created by the light beam on a reflective or transparent screen positioned at a distance in front of the photosensitive sensor of the at least one primary digital imaging device, the electronic images captured by the at least one primary digital imaging device providing an indication of the horizontal position of the installation platform in relation to the elevator shaft.

7. The method according to claim 5, wherein the at least one light source includes two light sources including a first light source and a second light source at predetermined positions in the elevator shaft below the installation platform, the first light source producing a vertically upwards directed collimated first light beam and second light source configured to produce a vertically upwards directed collimated second light beam, the at least one primary digital imaging device includes three primary digital imaging devices on the installation platform, arranging a beam splitter on the installation platform in a position on a vertical line above the second light source, the beam splitter configured to divide the second light beam into a first portion and a second portion such that the first portion passes directly vertically upwards through the beam splitter to a third of the three primary digital imaging devices and the second portion is turned 90 degrees towards a second of the three primary digital imaging devices, and the method further comprises:

capturing, via a first of the three primary digital imaging devices, electronic images of one of (i) the first light beam hitting the photosensitive sensor of the first of the three primary digital imaging devices and (ii) a pattern created by the first light beam on a reflective or transparent screen positioned at a distance in front of the photosensitive sensor of the first of the three primary digital imaging devices;

capturing, via a second of the three primary digital imaging device, electronic images of one of (i) the second portion of the second light beam hitting the photosensitive sensor of the second of the three primary digital imaging devices and (ii) a pattern created by the second portion of the second light beam on a reflective or transparent screen positioned at a distance in front of the photosensitive sensor of the second of the three primary digital imaging devices; and capturing, via a third of the three primary digital imaging device, electronic images of one of (i) the first portion of the second light beam hitting the photosensitive sensor of the third of the three primary digital imaging devices and (ii) a pattern created by the first portion of the second light beam on a reflective or transparent screen positioned in front of the photosensitive sensor of the third of the three primary digital imaging devices, wherein the electronic images captured by the first and the second of the three primary digital imaging devices, which are on a same horizontal level as the installation platform, providing an indication of the horizontal position of the installation platform in relation to the elevator shaft, and the electronic images captured by the second and the third of the three primary digital imaging devices, which are above each other on the installation platform, providing an indication of a tilt of the installation platform in relation to the elevator shaft.

8. The method of claim 7, further comprising:

arranging two secondary digital imaging devices each at a position on a vertical line above the respective light source in the elevator shaft and above the installation platform;

arranging three beam splitters on the installation platform, the three beam splitters including a first beam splitter, a second beam splitter and a third beam splitter, the first beam splitter on the installation platform in a position on a vertical line above the first light source, the first beam splitter configured to divide the first light beam into a first portion and a second portion such that the first portion first portion passes directly vertically upwards through the first beam splitter to the first of the two secondary digital imaging devices and the second portion is turned 90 degrees towards the first of the three primary digital imaging devices, the second beam splitter being the beam splitter above the second light source, and the third beam splitter being on the installation platform on a vertical line above the second beam splitter, the third beam splitter configured to divide the portion of the second light beam that passes directly vertically upwards through the second beam splitter into a first portion and a second portion such that the first portion passes directly vertically upwards through the third beam splitter to the second of the two secondary digital imaging devices and the second portion is turned 90 degrees towards the second of the three primary digital imaging devices;

capturing, via a first of the two secondary digital imaging devices, electronic images of one of (i) the first portion of the first light beam hitting the photosensitive sensor of the first of the two secondary digital imaging devices and (ii) a pattern created by the first portion of the first light beam on a reflective or transparent screen positioned at a distance in front of the photosensitive sensor of the first of the two secondary digital imaging devices; and capturing, via a second of the two secondary digital imaging devices, electronic images of one of (i) the portion of the second light beam that passes directly vertically upwards through the second beam splitter and the third beam splitter and hits the photosensitive sensor of the second of the two secondary digital imaging devices and (ii) a pattern created by the first portion of the second light beam on a reflective or transparent screen positioned at a distance in front of the photosensitive sensor of the second of the two secondary digital imaging devices, wherein the electronic images captured by the two secondary digital imaging devices provide an indication of an amount of bending of the elevator shaft.

* * * * *